United States Patent
Pritchard (10) Patent No.: US 9,637,396 B2
(45) Date of Patent: May 2, 2017

(54) LIQUID EXTRACTION METHOD EMPLOYING DIP TUBE

(75) Inventor: Michael Pritchard, Suffolk (GB)

(73) Assignee: PRITCHARD SPRAY IP LIMITED, Colchester (GB)

( * ) Notice: Subject to any disclaimer, the term of this patent is extended or adjusted under 35 U.S.C. 154(b) by 800 days.

(21) Appl. No.: 13/405,688

(22) Filed: Feb. 27, 2012

(65) Prior Publication Data

US 2012/0152844 A1  Jun. 21, 2012

Related U.S. Application Data

(63) Continuation of application No. 12/294,426, filed as application No. PCT/GB2007/003623 on Sep. 25, 2007, now Pat. No. 8,147,685.

(30) Foreign Application Priority Data

Sep. 25, 2006 (GB) .................................. 0618892.4

(51) Int. Cl.
    C02F 1/44      (2006.01)
    B01D 63/02     (2006.01)
    C02F 1/00      (2006.01)
    C02F 1/28      (2006.01)

(52) U.S. Cl.
    CPC ............ *C02F 1/002* (2013.01); *B01D 63/025* (2013.01); *B01D 2313/02* (2013.01); *B01D 2313/125* (2013.01); *B01D 2313/243* (2013.01); *B01D 2313/44* (2013.01); *B01D 2321/04* (2013.01); *B01D 2325/36* (2013.01); *C02F 1/283* (2013.01); *C02F 1/444* (2013.01); *C02F 2307/02* (2013.01)

(58) Field of Classification Search
    None
    See application file for complete search history.

(56) References Cited

U.S. PATENT DOCUMENTS

| 4,477,347 | A  | 10/1984 | Sylva |
| 4,714,550 | A  | 12/1987 | Malson et al. |
| 5,106,500 | A  | 4/1992  | Hembree et al. |
| 5,552,046 | A  | 9/1996  | Johnston et al. |
| 6,010,626 | A  | 1/2000  | D'Agostino |
| 6,117,319 | A  | 9/2000  | Cranshaw |
| 6,379,544 | B1 | 4/2002  | Chen |
| 6,569,329 | B1 | 5/2003  | Nohren, Jr. |
| 6,833,072 | B1 | 12/2004 | Krestine et al. |

(Continued)

FOREIGN PATENT DOCUMENTS

| EP | 0445989 A2    | 9/1991 |
| WO | 2006/021966 A1 | 3/2006 |

OTHER PUBLICATIONS

Gabelman et al, "Hollow fiber membrane contactors", Journal of Membrane Science, 159 (1999) 61-106.*

*Primary Examiner* — Krishnan S Menon
(74) *Attorney, Agent, or Firm* — Singularity LLP (57) ABSTRACT

A container for liquids is provided, in which pressurization of the container is used to force the liquid through one or more membranes to an output. The membranes are disposed across substantially an entire length of the container, and pass liquid in preference to the air. As a result, the liquid may be extracted from the container in any orientation. A particular use for this kind of container is as a portable water bottle containing a filter.

7 Claims, 5 Drawing Sheets

(56) References Cited

U.S. PATENT DOCUMENTS

| | | |
|---|---|---|
| 7,507,338 B2 | 3/2009 | Bommi et al. |
| 7,575,678 B2 | 8/2009 | Kuo |
| 7,854,848 B2 | 12/2010 | Olson et al. |
| 2003/0164333 A1* | 9/2003 | Nohren et al. ................ 210/650 |
| 2004/0112826 A1* | 6/2004 | Chiba et al. .................. 210/454 |
| 2005/0000883 A1* | 1/2005 | Kouters et al. .......... 210/321.89 |
| 2006/0037911 A1* | 2/2006 | Dasgupta et al. ............ 210/656 |
| 2007/0151924 A1* | 7/2007 | Mir et al. ..................... 210/637 |

* cited by examiner

LIQUID EXTRACTION METHOD EMPLOYING DIP TUBE

CROSS-REFERENCE TO RELATED APPLICATIONS

The present invention is a continuation of and claims the benefit of co-pending U.S. application Ser. No. 12/294,426 which is based on PCT/GB2007/003623 filed Sep. 25, 2007, now U.S. Pat. No. 8,147,685. The disclosures of these applications and US Patent are incorporated herein by reference in their entirety.

FIELD OF THE INVENTION

The present invention relates to devices for removing impurities from water. The present invention also relates to fluid dispensers that function in any orientation.

BACKGROUND TO THE INVENTION

In the absence of a ready source of drinking water, it is common for people to carry bottles or other receptacles containing potable water. Bottles are pre-filled in order that the person should have access to safe drinking water.

However, this approach presents a number of problems. It is difficult and often impossible to guarantee the quality of the water they are using to fill their bottle. The person has to make a calculation of the time they will be away from the nearest source of drinking water and carry an appropriate amount of water with them for their journey. The amount of water that the person can carry is finite. However, the amount of water required is susceptible to both delays in their journey and changes in conditions (for example, the weather gets hotter they will consume more water). In extreme conditions this lack of access to potable water can lead to death.

Furthermore, if the person chooses to drink the water from the surrounding environment they run the risk of becoming poisoned by chemicals or struck down by disease through the ingestion of bacteria or viruses living naturally in the water. Additionally if the person only had access to saltwater the consequences of drinking this are severe. Drinking seawater leads to dehydration which leads to seizures, unconsciousness, and brain damage. In extreme circumstance the kidneys become overwhelmed and shut down. This leads to death.

The use of sanitising tablets (chemical disinfectant) is one current method of killing bacteria and viruses in the water. However, it does not remove hazardous chemicals. Furthermore, even if precise instructions for use are followed a risk still remains that the bacteria or viruses are not killed. This is because they often reside within particulate matter suspended in the water which the disinfectant is unable to penetrate. This method therefore cannot be successfully relied upon to protect the user and leaves them susceptible to illness and or death. Furthermore these disinfectant chemicals remain in the water leaving a foul and unpleasant residual taste in the mouth of the user. Additionally, some people have an intolerance to these chemical disinfectants.

Another current method of water purification is to use a portable rudimentary filter. However, while some portable devices are able to remove bacteria to an acceptably safe level, they are unable to remove viruses because the pore size of the filter is simply too large. The pore size in a filter is the diameter of the holes through which the material to be filtered is passed. They are also unable to remove chemicals to an acceptable level. Moreover they are unable to desalinate the water.

All of the current methods for carrying or purifying water are unsatisfactory as they do not provide adequate filtration to ensure water is safe for consumption.

Another difficulty that has been found in the field of conventional liquid carriers is that it is typically necessary to hold the carrier in a particular orientation if liquid is to be dispensed. This can make the carriers awkward to use in various circumstances.

SUMMARY OF THE INVENTION

According to a first aspect of the present invention there is provided device for removing impurities from water, the device comprising:
  a fluid path defined by a liquid reservoir, a filter, and an output;
  means for pressurising the liquid reservoir such that, when the output is in an open position, a pressure differential induces a flow of water along the fluid path through the filter to the output,
  wherein the filter has a pore size of less than or equal to 25 nanometers.

In preferred embodiments, the present invention provides a water bottle containing an ultra-fine filter. Water is passed through the filter under pressure. This allows the water to be passed through finer filters than would be possible if the container were not pressurised. The present invention is therefore able to make use of existing filter types that have not typically been used in portable devices.

A pore size of less than or equal to 25 nanometers is sufficient to remove most microbiological matter from the liquid, including viruses, thereby providing safe drinking water and a far more effective portable water filtration system than has previously been available. However, for additional security, preferred embodiments of the invention have a pore size of less than or equal to 20 nanometers, and more preferably have a pore size of less than or equal to 15 nanometers.

As is known in the art, the pore size of a material is in fact an average of the individual sizes of the pores (or holes) in the material, since it is inevitable that any material comprising a large number of pores will include some variation in these individual sizes. Preferred filters for use in the present invention have a tightly defined distribution of pore sizes such that the difference between the maximum pore size and the average pores size is minimized. Preferably, the standard deviation of the pore size distribution is less than 30% of the average pore size, and more preferably is less than 15% of the average pore size. In preferred embodiments of the invention, the filter has a maximum pore size of less than or equal to 30 nanometers, more preferably, less than or equal to 25 nanometers, and most preferably less than or equal to 20 nanometers. In other embodiments, the maximum pore size may be even lower in order to perform nanofiltration or reverse osmosis, for example.

Preferred filters for use with the present invention are suitable for ultrafiltration, that is to remove all particles of a size greater than 0.01 microns. In another preferred embodiments the filter is suitable for nanofiltration or reverse osmosis. Reverse osmosis filters are capable of removing everything (including salts and oils) apart from pure water ($H_2O$) from a liquid. Nanofiltration removes particles of a size greater than 0.001 microns (including aqueous salts).

The filter may be formed of a plurality of sub-filters. The sub-filters may be exact replicas of each other or may differ in any parameter. For example, the sub-filters may become progressively finer (have progressively smaller pore sizes) along the fluid path.

Additional filters may be placed in the fluid path as required.

Preferably, the device of the present invention will filter water with a pressure differential of any size. For example, the operating pressure differential of a preferred embodiment is preferably greater than 10 kPa, more preferably in the range of 50 kPa-1500 kPa, more preferably in the range of 100 kPa-1000 kPa, more preferably 150 kPa-300 kPa.

The filter of the present invention is preferably a membrane filter. It preferably comprises at least one hydrophilic membrane. Hydrophilic membranes are attractive to water and therefore water is passed through them in preference to other liquids and to gases. In this way, not only is the filtration offered by the preferred embodiments improved but it is possible to use the filter even when it is not completely immersed in the liquid.

The surface area of the of the membrane filter material of the present invention is preferably greater than 0.05 $m^2$, more preferably greater than 0.1 $m^2$, more preferably greater than 0.2 $m^2$, more preferably greater than 0.25 $m^2$. A preferred surface area is about 0.3 $m^2$. Preferably, the surface area is less than 1 $m^2$.

Preferably, the membranes are capillary membranes. They are also preferably semi-permeable. The membranes act to filter the water as only particles smaller than their pore size may pass through them. The fibre membranes may incorporate carbon or other chemical elements, or reverse osmosis membranes. A combination of different types of filter membranes may be included in the filter. These may include ultrafiltration, nanofiltration and reverse-osmosis membranes.

Once water enters a capillary membrane it is transferred along its tube-like structure to the output. As a result, water may enter at any point along the membrane and reach the output while also being filtered.

Preferably, the filter lies substantially along an entire length of a liquid reservoir, ensuring that any liquid in the reservoir is in contact with the membranes, and passes liquids in preference to gas. Preferably, the filter lies along over 70% of said length of the reservoir, more preferably over 80%, more preferably over 90%. This means that when a pressure differential exists between the container and the outside atmosphere, and the output is open, liquid in the container will pass through the filter to the output regardless of the orientation of the device. As such, in preferred embodiments the present invention allows liquids to be dispensed from a container in any orientation.

Preferably, the output includes a flow restrictor. In a preferred embodiment, the output is a nozzle having an open position and a closed position, where liquid may be extracted from the device when the nozzle is in an open position.

Preferably, the means for pressuring comprises a pump. More preferably, the pump is a manually operated pump. Alternatively, other pressurising means such as compressed gas, or chemical reactants may be used.

Preferably, the pump is a piston pump comprising a non-return valve through which air may be passed into the container, and a piston shaft through which a piston head may be moved such that air is passed through the non-return valve.

In one preferred embodiment, the pump is removable from the device to allow the liquid reservoir to be refilled.

In one preferred embodiment, the piston shaft runs through the filter. Preferably, the liquid reservoir, the filter, and the piston shaft are substantially cylindrical and have substantially the same central axis. These preferred features of the present invention provide a compact device, thereby improving the portability of the device Preferably, the filter comprises an annular housing having an outer wall having a plurality of holes therethrough. In one preferred embodiment of the present invention the filter is substantially cylindrical. Preferably, the holes are distributed across substantially the whole length of the filter.

The filter is preferably removable from the device. This allows the filter to be cleaned and replaced as required.

The present invention may also comprise a visual indicator allowing inspection of the contents of the device. For example, a transparent window may be provided in the liquid reservoir.

Preferably, the present invention comprises a pressure regulator. For example, the pressure regulation means may include a release valve adapted to release liquid and/or air if the pressure in the container exceeds a predetermined level.

Preferably, the membranes lie along at least 90% of the length of the liquid reservoir. Moreover, the outer perimeter of the membranes in the plane normal to the entire length preferably defines an area greater than or equal to 50% of the area of the liquid reservoir in this plane. For example, the membranes may surround the liquid reservoir, or, if placed within the reservoir, extend substantially across the reservoir. This helps to ensure that liquid is in contact with the membranes at all times.

The principles of the present invention have been found to be advantageous in other contexts apart from water filters. For example, dispensers used for spray paints, deodorants and perfumes, amongst others, conventionally require the dispenser to be held in a given orientation, particularly when the level of liquid within the container is low.

According to a second aspect of the present invention, there is provided a fluid delivery device comprising:
 a fluid path defined by a liquid reservoir, one or more membranes, and an output; and,
 means for pressurising the liquid reservoir,
 wherein the fluid path is arranged such that, when the output is in an open position a pressure differential induces a flow of liquid along the fluid path through the one or more membranes to the output,
 and wherein the one or more membranes and the liquid reservoir are arranged such that liquid in the reservoir is in contact with the membranes in substantially any orientation, and the one or more membranes are adapted to pass liquid in preference to gas.

The second aspect of the present invention allows fluid to be dispensed from a fluid delivery device in any orientation. Its application is not limited to the extraction of water and will instead work with any liquid. Equally, the pressure need not be provided by air but may be provided by any gas. Moreover, given that the device is not required for filtration, the pore size of the membranes need not be limited by the requirement to remove any particular matter from the device. The pore size will instead be chosen according to the requirements of the particular device, on the basis of such variables as: the viscosity of the liquid, the surface area of the membrane and the applied pressure.

Preferably, the one or more membranes extend substantially across an entire length of the liquid reservoir.

The means for pressurising the liquid reservoir may involve mechanical means such as a pump. Alternatively, they may include pre-pressurising the liquid reservoir before or during assembly of the device. Moreover, other means for pressurising the reservoir are envisaged, such as chemical means.

The one or more membranes need not act as a filter, but will pass liquids in preference to gas. The device is arranged such that the one or more membranes are always in contact with liquid in the liquid reservoir regardless of the orientation or the reservoir. In one preferred embodiment, the sidewalls of the liquid reservoir are substantially covered by the one or more membranes.

According to a third aspect of the present invention, there is provided a device for removing impurities from water, the device comprising:
- a fluid path defined by a liquid reservoir, a filter, and an output; and,
- a pump for pressurising the liquid reservoir such that, when the output is in an open position, a pressure differential induces a flow of water along the fluid path through the filter to the output, the pump comprising:
- a non-return valve through which air may be pumped into the liquid reservoir; and,
- a piston shaft through which a piston head may be moved such that air is pumped through the non-return valve, wherein the piston shaft is substantially surrounded by the filter.

Preferred embodiments of the third aspect of the present invention offer a portable water bottle incorporating a filter, the bottle having a compact and ergonomic design. The piston shaft passes through the centre of the filter, allowing an efficient use of space within the device as well as providing a stable arrangement for actuation of the pump. It also allows the surface area of the filter to be optimised without interfering with the action or location of the piston.

Preferably, the filter of the third aspect runs along an entire length of the liquid reservoir and passes liquid in preference to gas.

BRIEF DESCRIPTION OF THE DRAWINGS

An example of the present invention will now be described in detail with reference to the accompanying drawings, in which.

DETAILED DESCRIPTION

The following description relates to a particular embodiment of the present invention in which the beneficial effects of the invention are used to provide a water bottle which incorporates an effective water filter capable of providing drinking water from contaminated sources. However, other uses for the present invention are envisaged, and will become clear from the following description. The invention may be used in any circumstance where it is desirable to dispense liquids from a pressurised container. For example, a container used to spray paint may be operable in any orientation as a result of the beneficial effects of the present invention. In particular, although the semi-permeable membranes described in relation to the following embodiment are used for the purposes of filtration and referred to hereinafter as part of the "filter" the principles of the present invention apply equally to tasks that do not rely on filtration.

Figure 1:
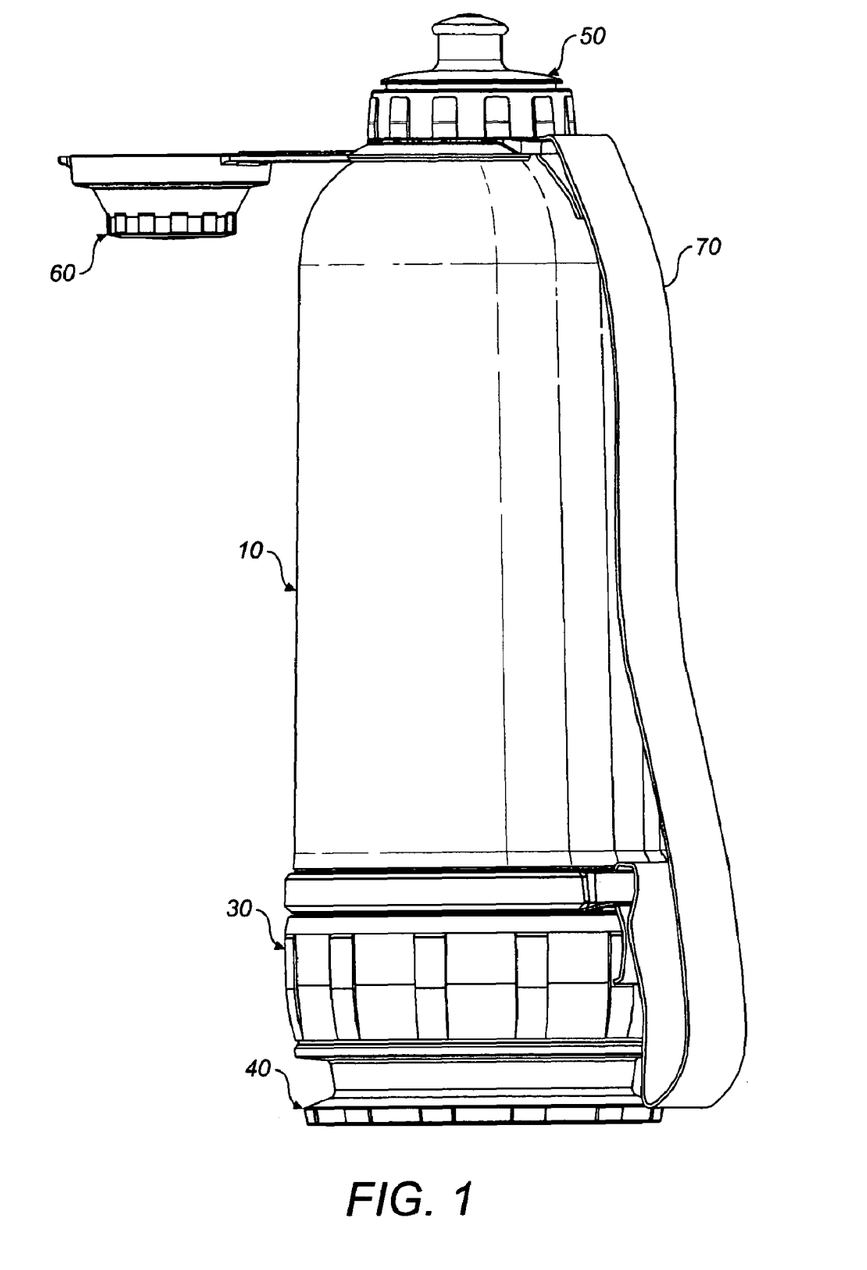
FIG. 1 shows a device according to the present invention.

FIG. 1 shows a water bottle designed in accordance with the present invention. The bottle comprises a container 10 acting as a liquid reservoir attached to a cap 50 and lid 60 at one end and a removable base 30 at the other. A handle 40 is integrally formed with the base 30 but has a degree of freedom along the axis of the container 10. When constructed the bottle is sealed and is both water- and air-tight. Also shown in FIG. 1 is a strap 70 attached to the bottle to aid portability.

Figure 2:
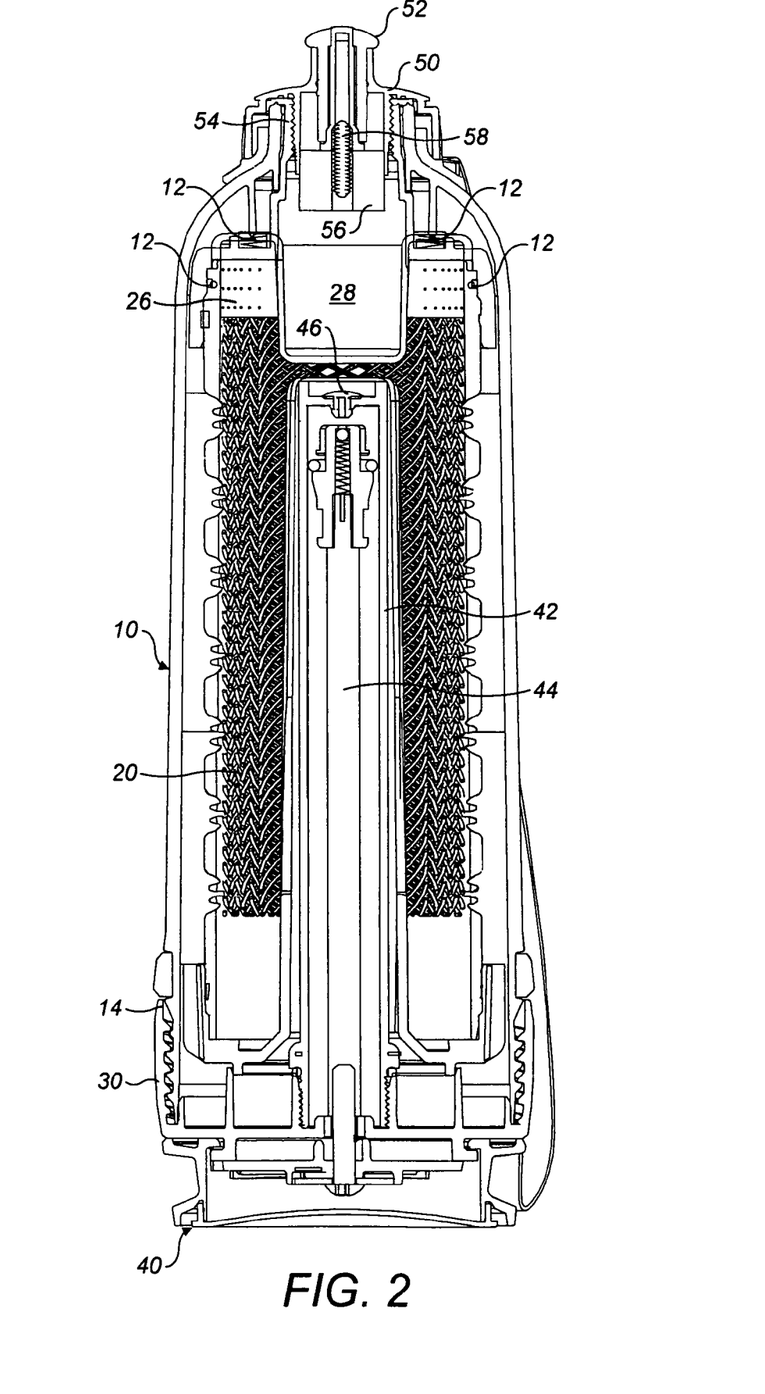
FIG. 2 shows a cut away sectional view of the device of FIG. 1.

FIG. 2 shows a cross-section of the bottle shown in FIG. 1. As can be seen from FIG. 2, a filter cartridge 20 is disposed within the container 10. The filter cartridge 20 abuts the base 30 and is removably attached to the cap 50 by a screw thread 54. Various food grade seals 12 are provided so that the seal between the filter cartridge 20 and the cap 50 and base 30 is both water and air tight.

The handle 40 is connected to a pump, which comprises a piston shaft 42 and a piston head 44, which runs through the piston shaft 42. When the base 30 is attached to the container (as shown in FIG. 2) the piston shaft 42 runs through the hollow centre of the filter 20. In this example, the base 30 is removably attached to the container 10 by means of a screw thread 14, with a food grade seal provided to ensure that the connection is both water- and air-tight.

The handle 40 and piston head 44 are fixed relative to each other such that movement of the handle 40 is effective to move the piston head 44 within the piston shaft 42. A non-return valve 46 is included at the distal end of the piston shaft 42, which allows movement of the piston head 44 into the piston shaft 42 to force air into the container 10, thereby increasing the pressure in the container 10, while movement of the head away from the distal end of the piston shaft does not remove the applied pressure.

It is envisaged that the handle 40 may include cavities for the storage of personal items. The handle 40 may also lock into the base 30 when not in use (for example, through appropriately designed protrusions from the handle into the base).

Though the embodiment shown in the Figures uses a hand actuated pump mechanism to pressurise the container, one skilled in the art will recognise that other means for pressurising the container may be used in accordance with the present invention. For example, compressed gas or means to deform the container may be used. For example, the container itself may be flexible so as to allow a user to introduce pressure by squeezing the container.

The pump shown in the present embodiment is a simple 1:1 pump, in that the pressure that the user must overcome to actuate the pump is equal to the pressure in the container. Nevertheless, it is possible to use ratcheting, or gearing, systems in accordance with the pump of the present invention. These mechanisms allows easier hand actuation of the pump (and consequently enable to pressure inside the container to be increased to a greater level than would otherwise be possible).

As shown in FIG. 2, the filter is sealed to the cap 50 via the screw thread 52. The cap 50 effectively acts as a nozzle and includes a non-chewable spout 52, which is engaged to a liquid seal when in a closed position such that liquid cannot pass through the nozzle 50. When the spout 52 is in an open position, liquid may pass through the nozzle 50. In this preferred embodiment, the spout 52 may be locked into the closed position (shown in FIG. 2) by twisting relative to its axis. When the nozzle 50 and filter 20 are sealed into place as shown in FIG. 2, liquid may only enter the nozzle 50 via the filter 20.

The cap 50 also incorporates an additional carbon filter 56, which attached to the structure of the cap 50 by a screw 58 embedded in the carbon filter 56. The device is arranged to ensure that liquid passes through the carbon filter 56 before leaving the bottle through the cap 50. Carbon filters are known to be effective in the removal of chemicals from water. Alternatively, or indeed additionally, different filters could be incorporated into the cap 50. For example, resin filters are known as effective desalinization filters. Filters of this or other types may also be incorporated into the filter cartridge 20.

The carbon filter used in the preferred embodiment is an active carbon filter, although other types of carbon-based filters (such as charcoal filters) may be adopted.

Carbon filtration, which utilizes a process known as adsorption, is a particularly effective technique for chlorine removal. Pesticides, herbicides, and other organic contaminants (especially volatile organics) may also removed by this material.

Carbon also removes trihalomethanes from the water. Trihalomethanes are a class of chemicals which result from the interaction of chlorine and decaying organic matter in the public water supply. These chemicals are known carcinogens, and the high levels found in local water supplies have been a cause for concern in recent years.

Activated carbon fibers (referred to as ACF) or other forms of carbon such as powders are manufactured by activating carbonized material at an elevated temperature in an activating gas atmosphere, typically steam and/or carbon dioxide and/or ammonia. Carbonized fibers are made by carbonizing polyacrylonitrile, phenol resin, pitch or cellulose fibers in an inert atmosphere. Such methods are well known in the art.

Activated carbons and, especially, known activated carbon fibers, have good adsorption capacity toward organic substances and an excellent ability to remove chlorine from water. The present invention may employ a standard activated carbon fiber filter, well known in the art, or it may use a modified activated carbon fiber filter.

Examples of modified activated carbon materials are disclosed in U.S. Pat. No. 4,831,011, U.S. Pat. No. 4,366,085 and U.S. Pat. No. 5,705,269.

The activated carbon matrix may provide, for example, bactericidal, cation-exchange, anion-exchange, heavy metal complex formation or other additional desired properties.

Though the spout 52 of the embodiment shown in the Figures is actuated by direct movement away from the filter 20, other means for extracting the liquid from the device are envisaged. For example, a variable valve mechanism, the valve being open and closed through movement on a screw thread, could be used.

A pre-filter (not shown in FIG. 2) may also be included in the device. In one preferred embodiment, this pre-filter takes the form of a mesh that covers the lower end of the container 10 when the base 30, handle 40 and pump are removed. The mesh may include linear cut lines at appropriate positions such that when the base 30, handle 40 and pump are attached to the filter, the pump may pass through the mesh without difficulty. Alternatively, the mesh may be removable from the device prior to attaching the base 30, handle 40 and pump. The pre-filter is designed to remove macroscopic and large microscopic impurities from the water before the filter cartridge 20 is used to remove smaller particles, bacteria and viruses.

In order to remove impurities from a liquid, the base 30 (along with the handle 20 and pump) is removed from the container and the untreated liquid is poured into the container (through the pre-filter). The base 30, handle 40 and pump are then re-attached to the container and the pump handle 42 is repeatedly moved from a withdrawn position to the closed position shown in FIGS. 1 and 2, thereby moving the piston head 44 up and down through the piston shaft 42. This has the effect of forcing air through the non-return valve 46, thereby increasing the pressure within the container.

After pressurising the container 10, the user opens the cap 50 by moving the spout 52 away from the body of the container 10. The pressure forces the water through the filter 20 into the cap 50 (via aperture 55) and ultimately out of the bottle for the user to collect. Having passed through the filter 20 the liquid may be considered safe to use (for example, as drinking water). The flow rate of the preferred embodiment is approximately 2.5 liters/minute at an induced pressure differential of 0.25 bar.

Figure 3:
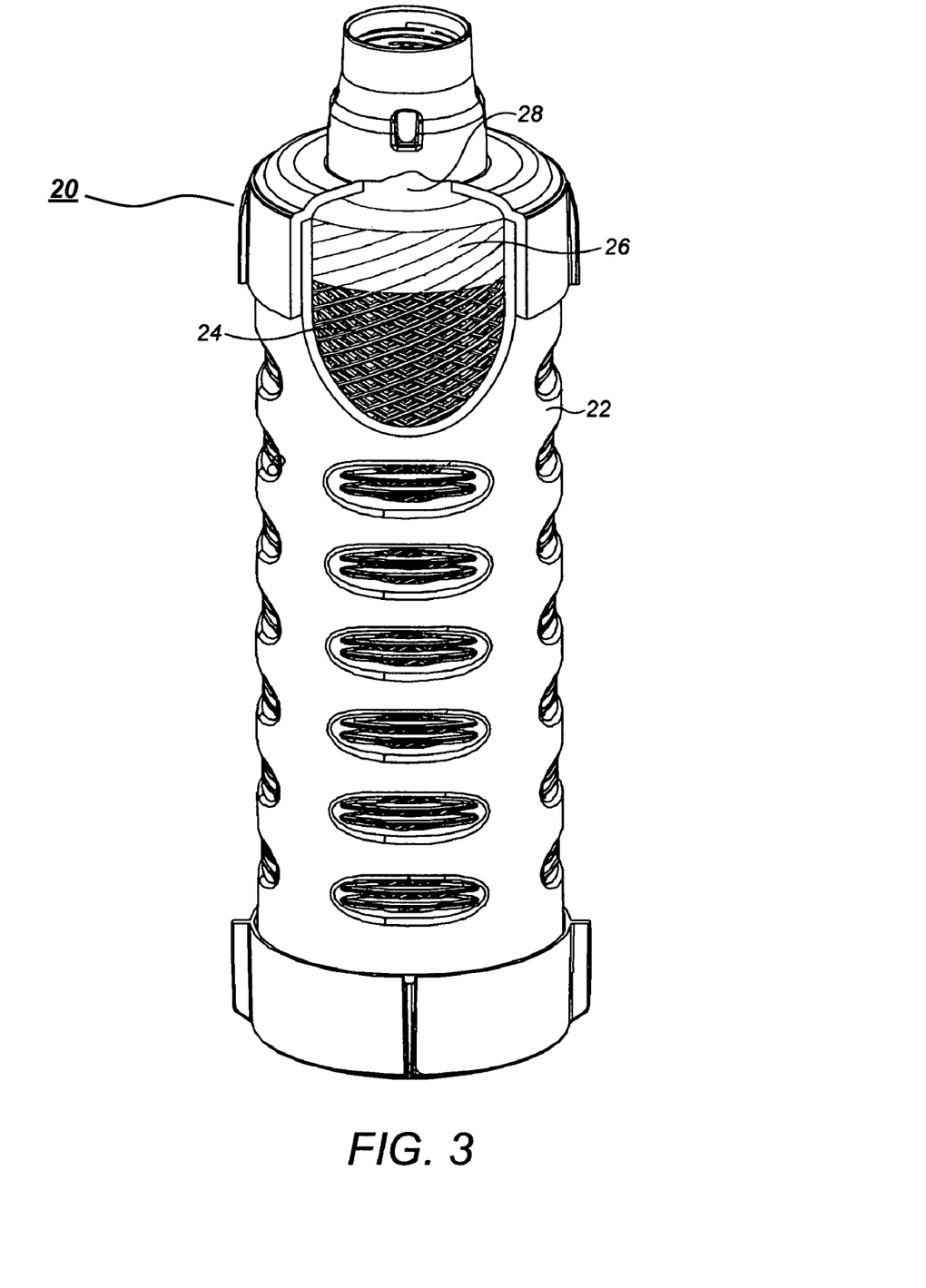
FIG. 3 shows a cut away sectional drawing of a replaceable filter cartridge that may be used in the preferred embodiment of the present invention.

FIG. 3 shows the filter cartridge 20 of one preferred embodiment. As shown, the filter cartridge 20 comprises a substantially annular housing 22 in which the fibre membranes 24 are disposed. The outer wall of the housing 22 contains a number of holes, allowing water from the container to enter the fibre membranes 24. These fibres are substantially in the form of flexible tubes, with the sidewalls of the tubes being semi-permeable. Water enters via the outer wall into the porous sidewalls of the fibre membranes 24, and as it does so is filtered. The water then passes through the fibre membranes into a receiving cavity 28. After the filtered water reaches the receiving cavity 28 it subsequently passes to the user via the cap shown in FIG. 2. As shown in FIG. 2, the fibre membranes are supported within a resin layer 26 at the upper end of the filter cartridge, this acts both to ensure the correct location and orientation of the fibre membranes and to provide a seal to prevent water that has not passed through the fibre membranes reaching the receiving cavity.

Clearly, with smaller openings in the semi-permeable membranes, smaller particles will be filtered from the liquid. In the preferred embodiment, the openings are sufficiently small to perform ultra-filtration, that is they are sufficiently small to remove viruses from the flow. Liquids such as water will not pass through such a fine filter without sufficient pressure, and the present invention provides means for introducing that pressure. Other envisaged types of filtration are nano-filtration and reverse osmosis.

The filter is effective to remove bacteria, viruses, cysts, parasites, fungi and all other water-born pathogens. In fact, filter removes all microbiological matter from the water. Safe drinking water is therefore delivered to the user.

Fibre membranes suitable for use with the present invention are available commercially, for example X-flow™ capillary members from Norit (www.norit.com) may be used. This hollow fibre ultrafiltration membrane is effective to screen all turbidity, bacteria as well as viruses.

Material suspended in the water causes cloudiness called turbidity. This is caused by clay, silt, microorganisms, and organic and inorganic materials. Turbidity is reported in "turbidity units." A reading greater than 5 units can be seen easily. Treated drinking water should have turbidity levels between 0.05 and 0.3 turbidity units.

Pathogens removed by the present invention include bacteria, protozoa, spores, viruses, cysts, and worms. The drinking water limit for fecal coliform bacteria is one organism for every 100 milliliters (mL) of sample water.

In preferred embodiments of the present invention the openings in the membranes are smaller than 15 nanometers. More preferably, they are smaller than 10 nanometers. This ensures that viruses as well as bacteria are filtered from the water. The filter membranes are preferably hydrophilic, and as a result water (or any other liquid) passes through them in preference to air (or any other gas). Alternatively or additionally, were the device designed to pass an oil-based liquid substance through the filter the filter membranes may be oleophilic (oil-attracting). Therefore, when a mixture of liquid and gas are in contact with the filter and the pressure in the container is increased the liquid (which is attracted to the surface of the filter membranes) is pushed through the filter before any gas.

The hydrophilic and hydrophobic properties of a membrane material are related to the surface tension of the material. The fundamental importance of surface tension comparison is that liquids having lower surface tension values will generally spread on materials of higher surface tension values.

The higher the surface tension value of the material, the more hydrophilic the material is. The membranes used in the filter are preferably hydrophilic. Hydrophilic membranes tend to exhibit greater fouling resistance than hydrophobic membranes. Particles that foul in aqueous media tend to be hydrophobic.

For example, the membranes preferably have a surface tension of greater than 25 dynes/cm, more preferably greater than 30 dynes/cm, more preferably greater than 35 dynes/cm.

The membrane preferably comprises materials selected from the group consisting of polytetrafluoroethylene, polyamide, polyimide, polysulfone, polyethersulfone, polyvinylidene fluoride, polypropylene, polyvinyl chloride, polyvinyl pyrrolidone, polycarbonate, polyacrylonitrile, cellulose, cellulose acetate, mixtures, blends and copolymers thereof.

Preferred membrane filter materials are selected from the group consisting of polysulfone, polyethersulfone, polyvinylidene fluoride, polyvinyl pyrrolidone, polyacrylonitrile, cellulose, cellulose acetate, mixtures, blends and copolymers thereof.

A particularly preferred membrane filter material comprises a blend of polyethersulfone and polyvinylpyrrolidone. Polyethersulfone (PES) polyvinylpyrrolidone (PVP) blends are highly oxidant tolerant (>250,000 ppm hours for chlorine, tolerant to permanganate and ozone), are tolerant to wide pH range (2-12 continuous operation, <1 for cleaning), exhibit resistance to oils and grease, and are highly hydrophilic.

Although the filter may in some embodiments be oleophilic, in other circumstances it is desirable to filter oil from the initial water. For example, this would be advantageous if drinking water is required from an initial source of water that has been contaminated by oils. A hydrophilic and non-oleophilic filter improves the filtration of oil from the initial source since water is attracted to the filter over oil and is therefore extracted preferentially.

The membranes used in preferred embodiments of the present invention have a retention of greater than log 6 (99.9999%) of bacteria, cysts, parasites and fungi, and greater than log 4 (99.99%) of viruses from the water. The membranes also remove sediments and other deposits from the water.

In some embodiments the filter cartridge 20 comprises a plurality of layers of fibre membranes, each filtering particles of differing sizes from the liquid. The membranes may also be formed from non-fibrous materials, such as ceramics.

In the preferred embodiment of the present invention, the outer wall of the annular housing 22 of the filter cartridge contains a plurality of holes. Preferably, these lie along the entire length of the filter cartridge 20. This allows water to be extracted from the device regardless of the device's orientation (as water will always be in contact with the fibre membranes 24). As water is passed through the filter membranes in preference to air, opening the cap 50 will always filter water and provide it to the user in preference to releasing air and thereby reducing the pressure in the storage area. For this reason the device may be used as long as any liquid is in contact with the filter (that is, it does not require the filter to be submerged entirely in the liquid). As a result, since the filter preferably extends across substantially the entire length of the container, the device may be operated in any orientation as liquid will always be in contact with the filter at some region regardless of orientation.

The preference for releasing liquid over air is also used to provide a spray that works with the device in any orientation. Such a device operates analogously to the embodiment shown in the Figures but uses an adapted cap to ensure that the liquid was released from the device in the form of a spray.

The housing 22 shown in FIG. 3 extends around the circumferential sidewalls (both internal and external) of the filter cartridge 20, and also covers the end walls, particularly the bottom end (that is, the opposite end to the location of the receiving cavity 26). It should also be understood that the cartridge may comprise a further protective layer on its inner wall. This protects against damage to the fragile fibre membranes when the device is assembled (for example, when the piston shaft 42 is placed in position through the centre of the filter cartridge 20).

The holes in the housing 22 may comprise a mesh, such that large particles in the liquid are removed before they reach the filter membranes. This provides a pre-filtration process before the liquid enters the filter membrane itself (in addition, or alternatively, to the pre-filtration provided by the above-described pre-filter).

The filter cartridge is removably attached to the reset of the device as shown in FIG. 2. An advantage of this architecture is that, although fully sealed when in place, the filter cartridge may be removed for cleaning or replacement at any time. In this way, the entire device need not be replaced if the filter cartridge becomes damaged in some way.

Though not shown in the Figures, a visual indicator may be included to allow the user to identify the contents of the container. For example, this could take the form of a transparent window in the side of the container. Indeed, in a preferred embodiment, the entire side-walls of the container are substantially translucent.

The present invention may also includes a pressure regulator within the container. For example, a valve may be provided in the container wall that opens at a predetermined pressure to allow either gas or liquid to expelled without passing through the filter. If liquid is expelled it may be either siphoned into an additional compartment incorporated into the device, or may leave the device altogether. Other pressure regulation systems may include a device that indicates to the user that the pressure within the container has reached a certain level, or may disable the pump (or other pressurisation means) once the pressure reaches this level.

Figure 4:
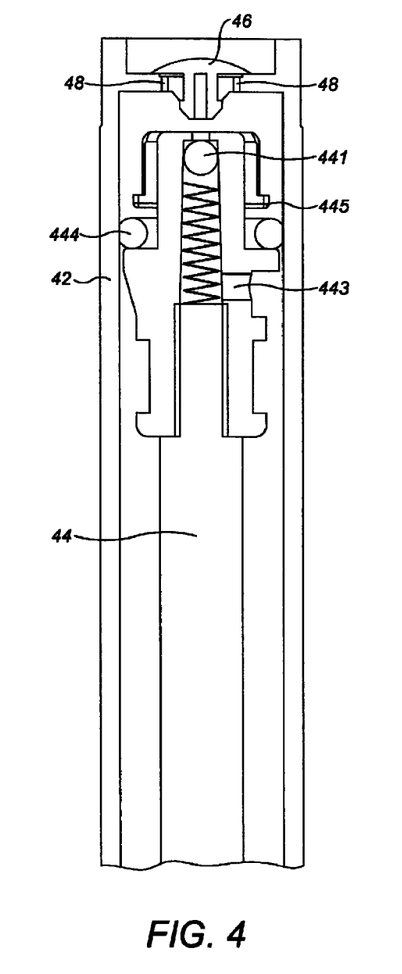
FIG. 4 shows a detailed cut away sectional drawing of a pump that may be used in the preferred embodiment of the present invention; and, FIG. 5 shows a cut away sectional drawing of a spray can according to the present invention.

A possible pressure regulation device is shown in FIG. 4, which also shows the non-return valve in more detail. As can be seen in this Figure, the non-return valve 46 has a mushroom-like shape. When the pump head 44 is introduced to the pump shaft 42 the pressure in the pump shaft 42 causes the lateral extremities of the non-return valve 46 to rise slightly, allowing air to enter the container 10 via holes 48 in the pump shaft 42. When the pump head 44 is removed the lateral extremities of the non-return valve 46 are retracted over these holes 48 to prevent gas leaving the container 10.

The pressure is regulated by a ball bearing 441 disposed within a passageway at the tip of the pump head 44. The ball bearing 441 is biased towards the tip of the pump head 44 by a spring 442. When pressure is applied to the container 10 the ball bearing 441 retracts down the passageway by a distance depending on the applied pressure. If the applied pressure reaches a pre-determined maximum level then the ball bearing 441 is retracted to such an extent that air may pass through an escape passageway 443 and down the pump shaft 42, thereby preventing additional pressure from being applied to the container 10. The pressure required to retract the spring 442 will depend upon the length of the spring 442 and the spring constant (according to Hooke's law). In this way the maximum pressure that can be applied to the container is regulated.

A sealing ring 444 is used to ensure that air is forced into the device when the head 44 is moved upwards through the shaft 42. Channels or grooves are provided in an upper ridge 445 holding the sealing ring 444 in place to ensure that on retraction of the pump head 44 from the pump shaft 42 air may pass into the region of the pump shaft 42 above the pump head 44 to avoid a vacuum in this region preventing extraction of the pump head 44.

As an example of the utility of pressure regulation, consider reverse osmosis. Reverse osmosis filters are capable of removing salt from water. However, as water from the storage area is filtered, that which remains in the storage area becomes more concentrated. This increases the likelihood that salt will get clogged in the filter, thereby reducing the filter's useful lifetime. It is therefore advantageous to provide a mechanism to prevent this eventuality arising.

It is also advantageous to regulate the pressure applied to the device to account for any failure in the filter membranes. For example, should the filter become clogged it would be unsafe to force water through it at high pressure due to the possibility that contaminants may also be forced through the filter.

In some circumstances it may be beneficial to create a flow of liquid in the container and around the filter. This has been found to reduce the rate at which filter membranes become clogged, and thus ineffective. In one example, the expulsion of liquid at a given pressure (for example, by the pressure regulation mechanism) may be adapted to create an appropriate flow.

Cross flow filtration processes, unlike conventional dead end filtration, have a filtration surface that is continuously swept by flowing liquid. A portion of the feed fluid passes through the filter to become filtrate, or permeate, fluid. The other portion of the feed fluid continues past the filter media and exits the filter unit as concentrate, or retentate, fluid. The shear of the flowing liquid along the tube wall minimizes the buildup of the solids on the filtration surface. Thus, cross-flow filtration affords the possibility of nearly steady state operation. With conventional dead-end filtration, the filtrate rate decays as the solids layer builds up. In cross-flow filtration, the direction of the feed flow is parallel to the filter surface so that accumulated solids are continuously swept away by the force of the flow.

This invention utilizes a hollow-fiber filter membranes for such purposes as the treatment of large volumes of water containing suspended matter. Hollow-fiber filter membranes have excellent filtering performance and, moreover, enable a large area of filter membrane to be contained in a unit volume.

Cross-flow filtration is a pressure-driven filtration process in which the process liquid flows parallel to the membrane surface. Under a pressure of 10 pounds per square inch (psi) to 100 psi, the filtrate passes through the membrane and exits as clear permeate. The rejected species are retained and collected for disposal or recycling. The membrane's performance is measured by the permeate flux and the rejection of the constituent metals.

In addition to the pore size, pore construction is critical to the performance of a membrane. Conventional filters have irregularly shaped pores that permit aggregation of particles at bottlenecks and crevices within the cross section of the filter. The filtration membrane pores are asymmetrical and shaped like inverted cones, with smaller diameters on the feed side and larger diameters on the permeate side (FIG. 3). Since any particle that passes through a pore continues unimpeded without accumulating within the membrane, UF membrane pores do not plug. Cleaning of these filters is thus easy and inexpensive and routine cleaning allows for repeated use over long periods of time. With proper operation and maintenance, UF membranes will operate for several years without replacement.

Membranes may be used in hollow fiber configurations. Hollow fiber membranes are made by extruding polymers into the shape of a tube. Hollow fibers are resistant to channel plugging. Hollow fiber may be back pulsed or subjected to reverse flow conditions to achieve optimum removal of foulants.

As mentioned previously, the principles of the present invention may be used in other applications. In particular, by providing one or more membranes adapted to pass liquid in preference to gases (for example, hydrophilic or oleophilic membranes) extending across substantially the entire length of a container, liquid stored within the container may be transferred to an outlet via the membranes by the application of pressure regardless of the orientation of the container. Moreover, it is possible to select one liquid over another in this way (for example a non-oleophilic, hydrophilic membrane will separate water from oil). The pressure may be manually applied as in the embodiment described above, or alternatively the container may be pre-pressurised.

Unlike the filtration task described above, a dispenser designed to function in any orientation need not be limited to any given pore size, since it does not need to remove particles of a given size from the liquid. The pore size may be chosen instead on the basis of the preferred flow rate given the viscosity of the liquid, the surface area of the filter and the pressure within the container.

Although the membranes in the above example are shown to be encompassed by the container, the reverse arrangement may also be effective. That is the container may be surrounded by the membranes. As such, the liquid would be held in a region surrounded by the membranes.

Figure 5:
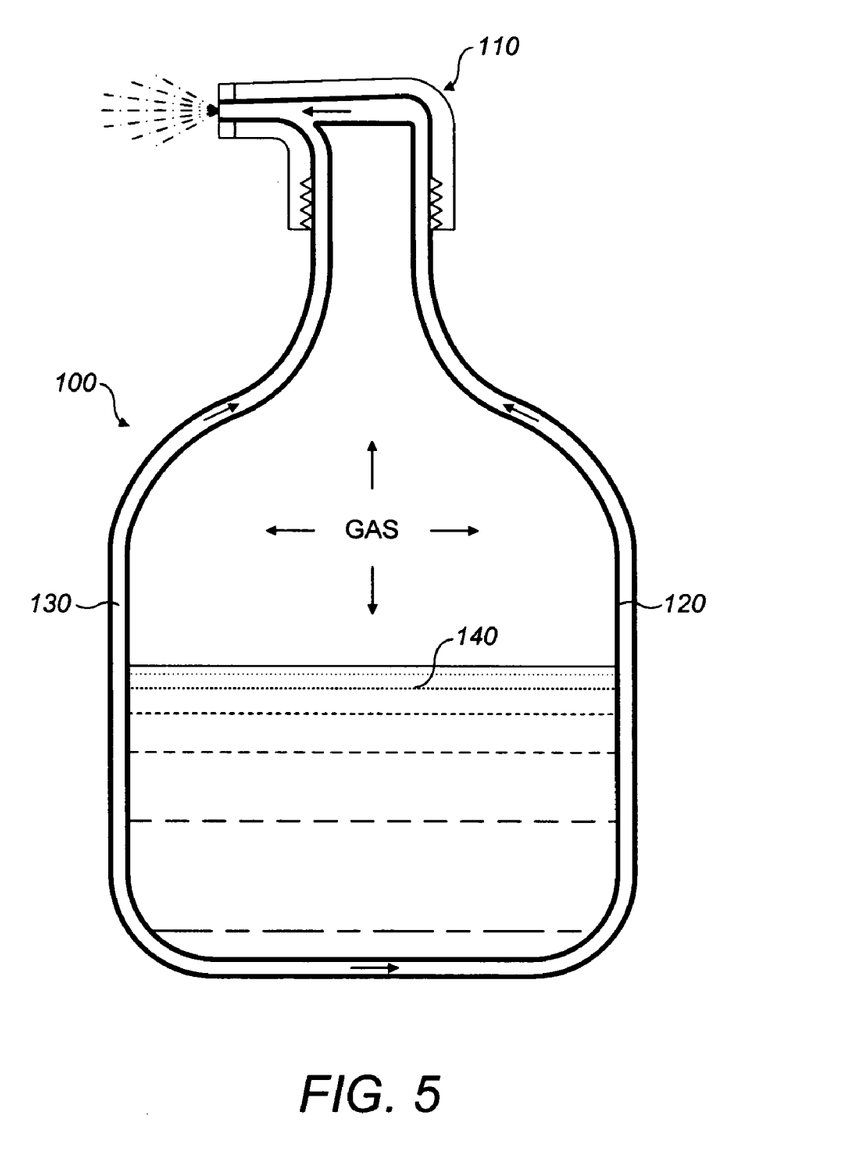

FIG. 5 shows an example of a spray dispenser 100 which functions in any orientation. A membrane 120 is deployed within the outer wall of the dispenser, defining a liquid reservoir 140 within the membrane 120. A mixture of gas and liquid is disposed in the liquid reservoir and is placed a higher pressure than the outside atmosphere.

The area between the membrane 120 and the outer walls of the dispenser defines a transfer region 130 and a cap 110 seals the top of the transfer region from the outside atmosphere. When the cap is opened a pressure differential exists between the liquid reservoir and the outside atmosphere, causing liquid to be forced through the membrane into the transfer region and ultimately through the cap to be expelled from the device.

The membrane shown in FIG. 5 passes liquid in preference to gas and entirely surrounds the liquid reservoir. As a result, the device will expel water when the cap is opened regardless of its orientation. Alternative arrangements may ensure that one or more membranes are in contact with liquid when the device is in any orientation. For example, a device having a rectilinear profile may have separate membranes running along substantially the entire length of each corner.

Only a single membrane is shown in FIG. 5. However, it is also envisaged that there may be multiple layers in the sidewalls, consisting, for example, of membranes having differing granularities. Unlike the membranes described in the context of the water filter above, the membranes shown in FIG. 5 are not in the form of hollow tubes. However, it is also envisaged that hollow tubes may be used in this context (and that alternative arrangements may be made in the case of the water filter above). Similarly, the membranes need not be integrated with the walls but may be independent of them.

In some embodiments, the membranes are in the form of hollow tubes and simply replace the conventional extraction straws found in prior art devices. In this way, the cost of manufacturing a dispenser that functions in any orientation is reduced. Once the hollow membrane has been placed in the dispenser, its flexibility allows it to be located as desired. For example, it many be pushed against the sidewalls.

It has been found that if the pores in the membrane walls are sufficiently small to ionize the water passing therethrough an advantageous capillary-like effect aids the transfer of the liquid through the transfer region.

Though the dispenser shown in FIG. 5 is pre-pressurised, a number of other techniques may be used to introduce a pressure differential between the container and the outside atmosphere. For example, a pump of the kind described in relation to the water filter above may be used. Alternatively, chemical means may be employed, or the sidewalls of the device may be flexible such that a user can apply pressure by squeezing the device.

Applications that benefit from the orientation-independent effects of the present invention include, but are not limited to, spray paints, spray deodorants, kitchen products and perfumes. These devices conventionally become ineffective in most orientations when the amount of liquid remaining is low as they require liquid to enter an extraction tube at a specific point.

The invention claimed is:

1. A method of dispensing liquid from a fluid delivery device comprising a dip tube consisting of a single hollow hydrophilic tubular membrane positioned within the fluid delivery device and a spray head coupled to the dip tube, the dip tube having a wall with pores that are sized as a function of viscosity of the liquid being dispensed and a surface area of the tubular membrane, the method comprising;
    applying a pressure differential through the pores in the wall of the single hollow hydrophilic tubular membrane; and
    passing liquid within the fluid delivery device through the wall of the single hollow hydrophilic tubular membrane and thereby to the spray head,
    wherein the membrane is sized to extend across substantially a length of the fluid delivery device, and
    wherein the liquid can be dispensed substantially independent of an orientation of the fluid delivery device.

2. The method of claim 1, wherein the membrane is flexible.

3. The method of claim 1, wherein the fluid delivery device further comprises a pump, and wherein applying the pressure differential comprises operating the pump.

4. The method of claim 1, wherein the fluid delivery device is pre-pressurised.

5. The method of claim 1, wherein the fluid delivery device further comprises a flexible wall, and wherein applying the pressure differential comprises squeezing the flexible wall.

6. The method of claim 1, wherein the liquid is selected from the group consisting of spray paints, spray deodorants, and perfumes.

7. The method of claim 1, wherein the membrane passes liquid in preference to gas.

* * * * *